April 16, 1929. I. R. LEDERER 1,709,179
CLOSURE BAR FOR OPEN BAIL MEMBERS
Filed July 7, 1927
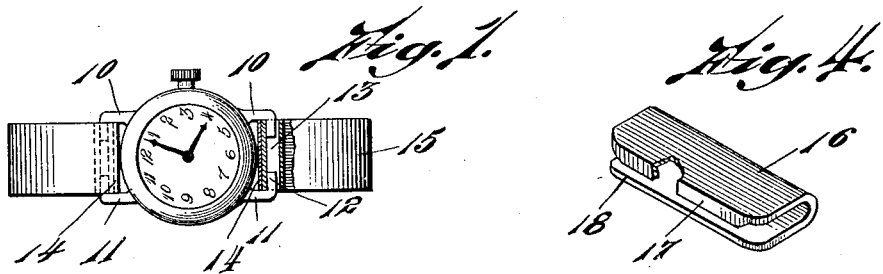
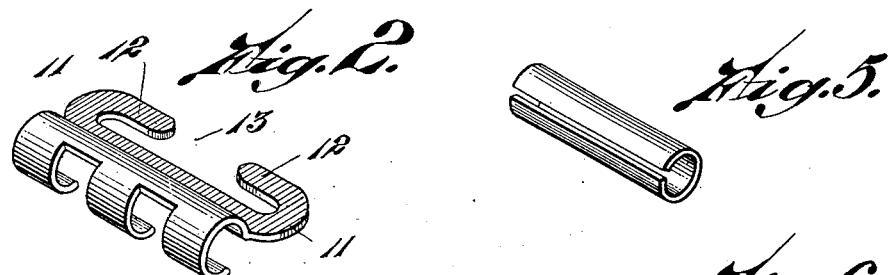
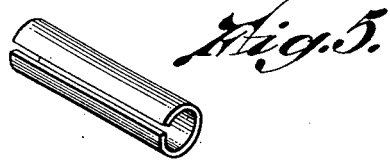
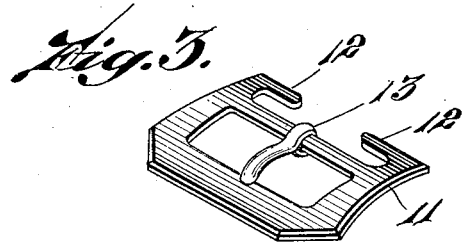
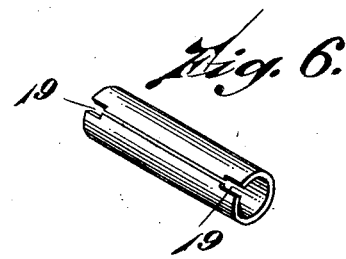
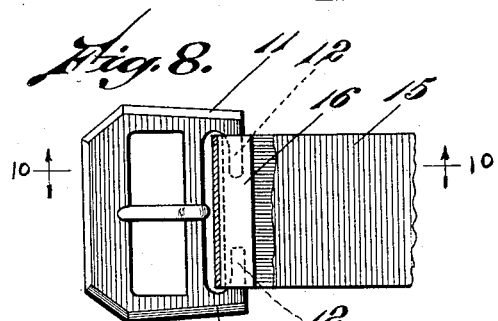
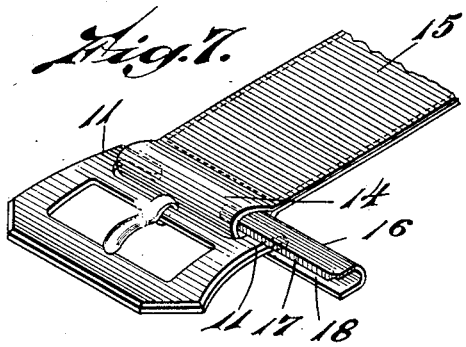
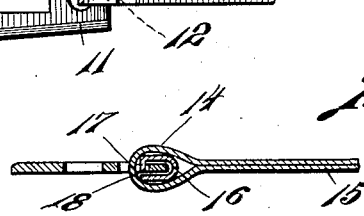
INVENTOR.
Irving R. Lederer.
BY Barlow & Barlow
ATTORNEYS.

Patented Apr. 16, 1929.

1,709,179

UNITED STATES PATENT OFFICE.

IRVING R. LEDERER, OF PROVIDENCE, RHODE ISLAND.

CLOSURE BAR FOR OPEN BAIL MEMBERS.

Application filed July 7, 1927. Serial No. 203,975.

This invention relates to an improved construction of bail member for a watch, buckle, clasp or the like, and has for its object to provide a cross bar to serve as a closure for the opening of an open bail member to be inserted after the strap, eye or loop has been positioned in the bail.

A further object of the invention is the provision of such a cross bar made in tubular form and adapted to fit inside the eye of a band member and is split longitudinally to straddle the side arms of the bail as it is forced endways through the strap eye to engage the inturned ends of the bail to close the space between them.

The invention further consists in the provision of notches formed in the cross bar adjacent the end portions thereof, the notches being at the split to receive the side arms and prevent accidental displacement of the bar after having been positioned on the bail.

With these and other objects in view, the invention consists of certain novel features of construction, as will be more fully described, and particularly pointed out in the appended claims.

In the accompanying drawings:

Figure 1 is a front view of a wrist watch having one form of open bail members to which my improved tubular cross bar is applied.

Figure 2 shows another member having an open bail member with the side arms turned inwardly leaving a space between them for the admission of the eye or loop of the flexible strap.

Figure 3 shows a buckle having a bail member applied thereto to which a flexible strap may be removably connected.

Figure 4 shows one form of tubular cross bar adapted to close the space between the inturned ends of the bail member.

Figure 5 shows another form of tubular cross bar also split longitudinally throughout its length.

Figure 6 shows the cross bar as provided with notched portions adjacent its opposite ends at the split.

Figure 7 illustrates the tubular cross bar in position to be inserted into the eye of a band or strap to close the space between the inturned ends of the bail portion.

Figure 8 shows one of the tubular cross bars as positioned on the bail portion of the buckle to close the opening between the bail ends.

Figure 9 shows the tubular cross bar as being of a length to extend across and close the bail opening and embrace the opposite side arms of the bail.

Figure 10 is a section on line 10—10 of Figure 8 showing the tubular cross bar inside of the loop or eye of the strap.

It is found in practice that where an open bail member is employed such as herein illustrated, in which the inturned end members are spaced sufficiently to permit the eye of a flexible leather strap or the like to be inserted thereinto, that often times after the strap has been worn for some time it becomes so flexible that an extra strain will cause it to slip through the openings between these inturned ends and so lose the watch or other article it is supposed to retain. In order to obviate this difficulty, I have provided a cross bar which may be inserted into the eye of the band after it has been positioned on the bail. This cross bar is so arranged that it will snap closed preferably by its own inherent resiliency when positioned between the side arms of the bail and so effectively prevent inadvertent displacement and securely lock the strap to the bail against accidental removal therefrom; and the following is a detailed description of the present embodiment of my invention and showing one means by which these advantageous results may be accomplished:

With reference to the drawings, 10 designates the bail of a watch, buckle, clasp or the like, each having side arms 11, the ends 12 of these side arms being turned inwardly toward each other and spaced as at 13 sufficiently to permit the eye portion 14 of a leather or flexible strap 15 to be tucked therethrough, and 16 designates one form of resilient cross bar which may be made in somewhat of a U-shape in cross section, as illustrated in Figure 4, the free end of one or both of the arms of the U being provided with an inturned lip 17 extending towards the opposite arm whereby a tube is formed having a longitudinally disposed split 18 throughout its length and is, therefore, adapted to be slid through the loop 14 of the strap 15 in the manner best illustrated in Figure 7, the split portion 18 of the bar being adapted to receive an arm 11 of the bail and be forced through the eye into the position best illustrated in Figure 8 where the tube embraces the inturned ends 12 of the arms to close the opening between them and upon passing beyond the first side arm of this bail will snap closed and thus serve to effectively prevent the tube from being accidentally moved out of its set or operative position.

In some instances, instead of forming the tube in U-shape, as illustrated in Figure 4, it may be formed circular in cross section and split for yieldingly gripping the side arms 11, as illustrated in Figure 5, while in other instances, as illustrated in Figure 6, the ends of the tube may be notched as at 19 to receive and yieldingly grip the side arms 11 and so prevent rotation or displacement of the tubular cross bar after having been positioned.

In some instances, instead of forming this bail member on the periphery of the watch, as illustrated in Figure 1, it may be attached to a hinge clamp as illustrated in Figure 2 or of a buckle as illustrated in Figures 3, 7, 8, 9 and 10 of the drawings.

My improved means of effectually locking the eye of a flexible strap onto an open bail member is very simple and practical in construction and by the use of this cross bar the strap is effectually locked to the bail against accidental removal therefrom but this cross bar may when desired have its split portion opened sufficiently by insertion of a knife or instrument to be forced out of position to again open up the bail and permit removal of the strap therefrom without the necessity of injuring the finished construction of the strap eye.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A bail member having side arms spaced to permit the passage of an attaching strap eye and a longitudinally split resilient cross bar adapted to fit inside the eye and extend across to straddle and releasably engage said arms and close said space.

2. A bail member having side arms with inturned end portions spaced apart to permit the passage of an attaching strap eye and a tubular cross bar split longitudinally to straddle and yieldingly grip a side arm of the bail as the bar is forced endways through the strap eye to engage the inturned ends and close the space between them.

3. In combination with a flexible strap having an attaching eye at one end, a bail member having spaced inturned attaching ends for said strap eye, a tubular resilient crossbar split longitudinally to straddle one side arm of the bail upon entering the said strap eye and of a length to lie between said side arms to receive said inturned ends and close the space between them.

4. A bail member having side arms with inturned end portions spaced apart to permit the passage of an attaching strap eye and a tubular cross bar split longitudinally to straddle and yieldingly grip the side arms of the bail as the bar is forced endways through the strap eye to engage the inturned ends and close the space between them, and the end portions of said tube being notched at the split to receive said side arms to prevent accidental rotation and displacement of the tube after having been positioned.

In testimony whereof I affix my signature.

IRVING R. LEDERER.